(12) United States Patent
Franklin et al.

(10) Patent No.: US 7,392,767 B2  
(45) Date of Patent: Jul. 1, 2008

(54) METHOD AND APPARATUS FOR HEATING A CIRCULATING FLUID USING A QUENCH COLUMN AND AN INDIRECT HEAT EXCHANGER

(75) Inventors: David A. Franklin, Houston, TX (US); Martin J. Rosetta, Houston, TX (US)

(73) Assignee: Black & Veatch Corporation, Overland Park, KS (US)

( * ) Notice: Subject to any disclaimer, the term of this patent is extended or adjusted under 35 U.S.C. 154(b) by 140 days.

(21) Appl. No.: 11/584,141

(22) Filed: Oct. 19, 2006

(65) Prior Publication Data

US 2008/0092827 A1    Apr. 24, 2008

(51) Int. Cl.  
*F22B 1/02* (2006.01)
(52) U.S. Cl. .................................. 122/33; 62/50.2
(58) Field of Classification Search ............... 122/31.1, 122/33; 62/50.2; 422/188, 196; 208/106  
See application file for complete search history.

(56) References Cited

U.S. PATENT DOCUMENTS

| | | | | |
|---|---|---|---|---|
| 2,543,743 A * | 2/1951 | Evans | ........................ | 585/535 |
| 4,170,115 A * | 10/1979 | Ooka et al. | .................. | 62/50.2 |
| 5,507,921 A * | 4/1996 | Best | ............................ | 203/41 |
| 5,716,587 A * | 2/1998 | Khanmamedov | ........... | 422/168 |
| 6,403,854 B1 * | 6/2002 | Miller et al. | ................ | 585/638 |
| 2006/0260330 A1* | 11/2006 | Rosetta et al. | ............... | 62/50.2 |

FOREIGN PATENT DOCUMENTS

JP    2002039695 A  *  2/2002

* cited by examiner

*Primary Examiner*—Gregory A Wilson  
(74) *Attorney, Agent, or Firm*—F. Lindsey Scott

(57) ABSTRACT

A quench column heater and a method for heating a circulating liquid in a gas-to-liquid heat exchanger and an indirect heat exchanger to produce a hot liquid stream for use for heat exchange in a selected process to supply heat to the process. One particularly useful application of the present invention is the revaporization of liquefied natural gas (LNG).

20 Claims, 4 Drawing Sheets

METHOD AND APPARATUS FOR HEATING A CIRCULATING FLUID USING A QUENCH COLUMN AND AN INDIRECT HEAT EXCHANGER

FIELD OF THE INVENTION

The present invention relates to a quench column heater and a method for heating a circulating liquid in a gas-to-liquid heat exchanger and an indirect heat exchanger to produce a hot liquid stream for use for heat exchange in a selected process to supply heat to the process. One particularly useful application of the present invention is the revaporization of liquefied natural gas (LNG).

BACKGROUND OF THE INVENTION

In many industrialized processes, heat is required at a temperature which is readily supplied by a circulating liquid, such as water. Such circulating streams require heating at a heat source to reheat the circulating liquid stream after it has given up heat in the area in which the heat was desired.

As indicated previously, one area wherein frequent applications of this type arise is in the revaporization of LNG.

In many remote areas of the world large natural gas deposits are found. These natural gas deposits, while constituting a valuable resource, have little value in the remote areas in which they are located. To utilize these resources effectively the natural gas must be moved to a commercial market area. This is frequently accomplished by liquefying the natural gas to produce LNG, which is then transported by ship or the like to a market place. Once the LNG arrives at the market place, the LNG must be revaporized for use as a fuel, for delivery to pipelines and the like. Other cryogenic fluids frequently require revaporization after transportation also, but by far the largest demand for processes of this type is for cryogenic natural gas revaporization.

The revaporization of the cryogenic natural gas requires the input of substantial quantities of heat. While seawater has been used in areas where seawater is readily available, certain disadvantages attend the use of seawater, not the least of which is lack of availability in some areas in which the LNG is to be revaporized. Other disadvantages relate to the corrosion of heat exchange surfaces by the seawater and the like.

In some instances, air has been used as a heat exchange medium to revaporize the cryogenic natural gas. One such process is shown in U.S. Ser. No. 11/133,762 entitled "Air Vaporizer" filed May 19, 2005 by Martin J. Rosetta, et al. This application is hereby incorporated in its entirety by reference. Other systems may also be used for the revaporization of the cryogenic liquid and include indirect heat exchangers such as shell and tube heat exchangers, direct fired heat exchangers in indirect heat exchange contact with the cryogenic gas as the like. In all such cases, substantial heat is required to revaporize the cryogenic natural gas.

In the air vaporization processes particularly, it would be desirable if a recirculating liquid stream could be used to heat the air prior to or during its passage through the revaporization vessels. Further it is desirable to heat the vaporized gas with a warm or hot liquid solution to raise it to a pipeline temperature after vaporization.

A continuing effort has been directed to the development of efficient equipment to provide a heated hot liquid stream in a recirculating loop for use in such processes.

SUMMARY OF THE INVENTION

According to the present invention, an effective heating and cooling system for use in a recirculating system comprises a quench column heater having a liquid inlet, a hot liquid outlet, a hot gas inlet and a cooled gas outlet and adapted to heat a liquid stream by heat exchange with a hot gas stream to produce a hot liquid stream and a cooled gas stream, the heater comprising: a heat exchanger including a passageway for the flow of an intermediate temperature liquid stream to produce a hot liquid stream and an intermediate temperature gas stream by indirect heat exchange contact with a passageway for the hot gas stream from the hot gas inlet to produce the hot liquid stream via the hot liquid outlet and the intermediate temperature gas stream; a quench column adapted to receive the liquid stream via the liquid inlet and pass the liquid stream into a quench column from a top of the quench column for recovery from a bottom of the quench column in gas-to-liquid contact with the intermediate temperature gas stream to produce an intermediate temperature liquid stream and a cooled gas stream for discharge via the cooled gas outlet; a collection zone to collect the intermediate temperature liquid from the quench column; and, a conduit in fluid communication with the collection zone and an intermediate temperature liquid inlet to the heat exchanger.

The invention further comprises a method for heating a liquid stream by a combination of gas-to-liquid contact in a quench heater and indirect heat exchange contact between the liquid stream and a hot gas stream, the method comprising: passing the liquid stream into a quench column for downward flow through the quench column in heat exchange direct contact with an intermediate temperature gas stream to produce a cool gas stream and an intermediate temperature liquid stream; passing the intermediate temperature liquid stream to an indirect heat exchange exchanger for heat exchange with the hot gas stream to produce a hot liquid stream and the intermediate temperature gas stream; recovering the hot liquid stream; and, discharging the cool gas stream.

DESCRIPTION OF PREFERRED EMBODIMENTS

In the discussion of the Figures, the same terms will be used throughout to refer to the same or similar components.

Figure 1:
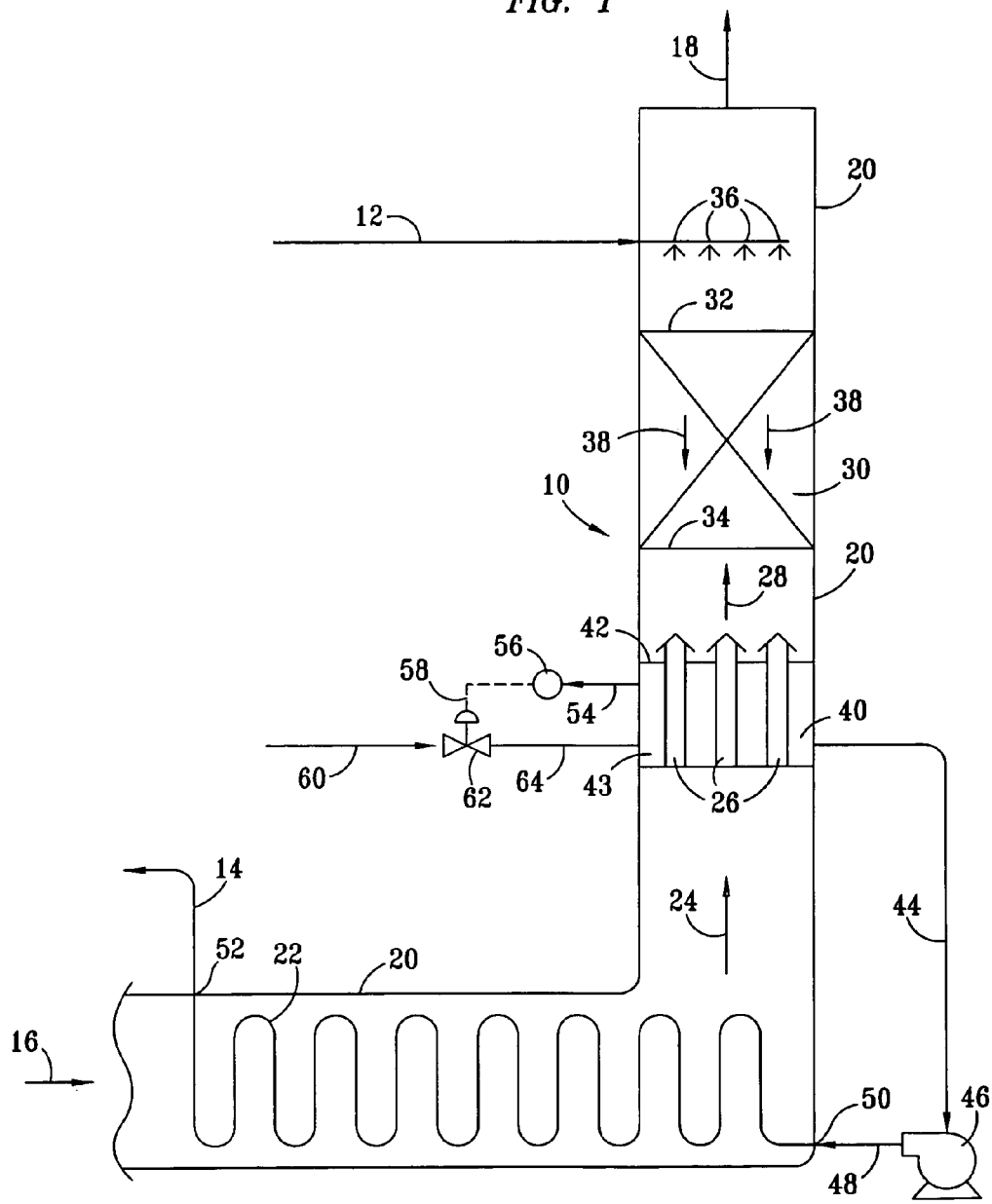
FIG. 1 is a schematic diagram of an embodiment of apparatus of the present invention.

In FIG. 1 a quench column heater 10 is shown. Heater 10 comprises a circulating liquid inlet 12, a heated circulating liquid outlet 14, a hot gas inlet 16 and a cooled exhaust gas outlet 18. A vessel 20 contains a heat exchanger 22 in which an intermediate temperature liquid is passed via a line 44, a pump 46 and a line 48 to an inlet to a heat exchanger 22 for heat exchange with hot gas passed to heat exchanger 22 via an inlet as shown by arrow 16. A hot liquid stream is recovered through a heat exchanger outlet 52 via a line 14. The resulting cooled exhaust gas is at an intermediate temperature and is recovered as shown by an arrow 24 and passed upwardly in vessel 20 through chimney trays 26 or other suitable equipment to pass the intermediate temperature gas through a liquid 40 having a liquid level 42 in a liquid collection zone 43 without direct liquid contact with the intermediate temperature gas. The intermediate temperature gas is passed upwardly as shown by arrow 28 into a quench packing column 30 through a bottom 34 of quench packing column 30 where it passes in direct heat exchange with downcoming liquid as shown by arrows 38. The liquid is passed into quench packing column 30 via a plurality of sprays 36 or liquid distributors in a manner well known to those skilled in the art and a top 32 of quench packing column from inlet line 12. The liquid passing through quench packing column 30 is in direct heat exchange contact with the intermediate temperature gas. The gas, after passing through quench packing column 30, is discharged through a line 18 at a temperature which is typically about 20° F. above ambient. This temperature may vary substantially and may be from about IQ to about 50° F. above ambient. The gas stream may be below ambient in some instances and may be passed to further treatment if necessary for the removal of carbon oxides or other materials.

The downcoming liquid 40 is collected in a liquid collection zone 43 having a level 42 and withdrawn from liquid collection zone 43 by a line 44 as discussed previously. A pH monitor 56 is connected via a line 54 in fluid communication with the liquid 40 in liquid collection zone 43 to maintain the pH of the intermediate temperature liquid in collection zone 43. This liquid is typically water, although other liquids could be used if desired. The pH is maintained typically in a range from about 6.0 to about 8.0. The pH tends to become increasingly acidic and is adjusted by the addition of an alkaline base material Such as sodium bicarbonate, soda ash, sodium hydroxide caustic, or the like. The alkaline material is added in response to signals from pH monitor 56 to a valve 62 via a connection shown as a broken line 58 through a treating chemicals line 60, a valve 62 and a line 64. While not shown, a filter may be positioned in the flow path, for instance in line 44, of the liquid to remove particulates which may accumulate in the liquid as it recirculates.

Figure 2:
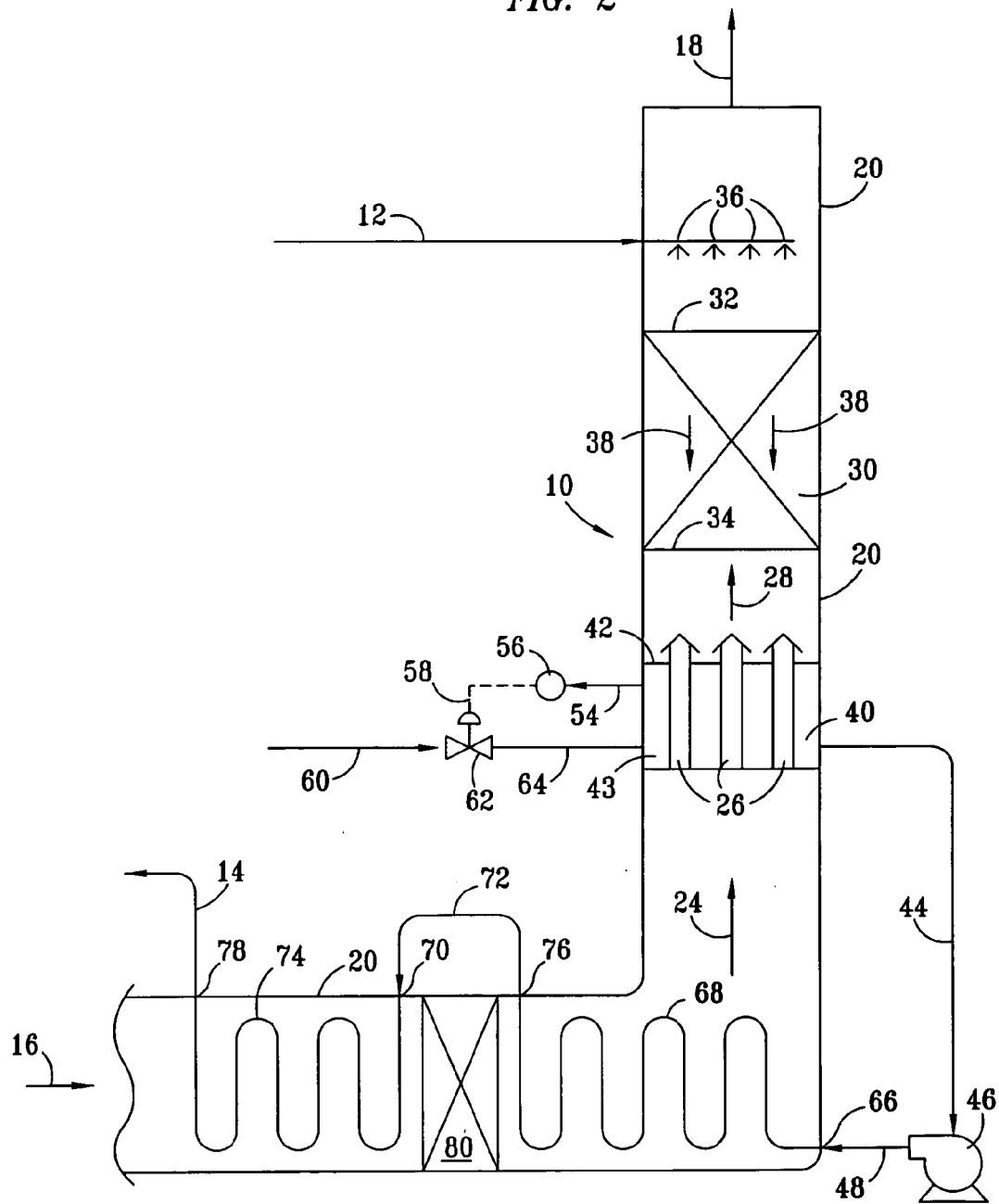
FIG. 2 shows an alternate embodiment of the apparatus of the present invention.

In FIG. 2, an alternate embodiment of the invention is shown. The invention functions generally as described with respect to FIG. 1 but in this embodiment the gas stream is passed through a heating zone 74, through an outlet 70, through a line 72 and back into a heating zone 68 via an inlet 76 to permit the positioning of an optional selective catalytic reduction unit 80 in vessel 20 as shown. Hot liquid is recovered from an outlet 78 from heat exchanger section 74. Such units are well known to those skilled in the art and are used to reduce the NOx content of gaseous streams.

Figure 3:
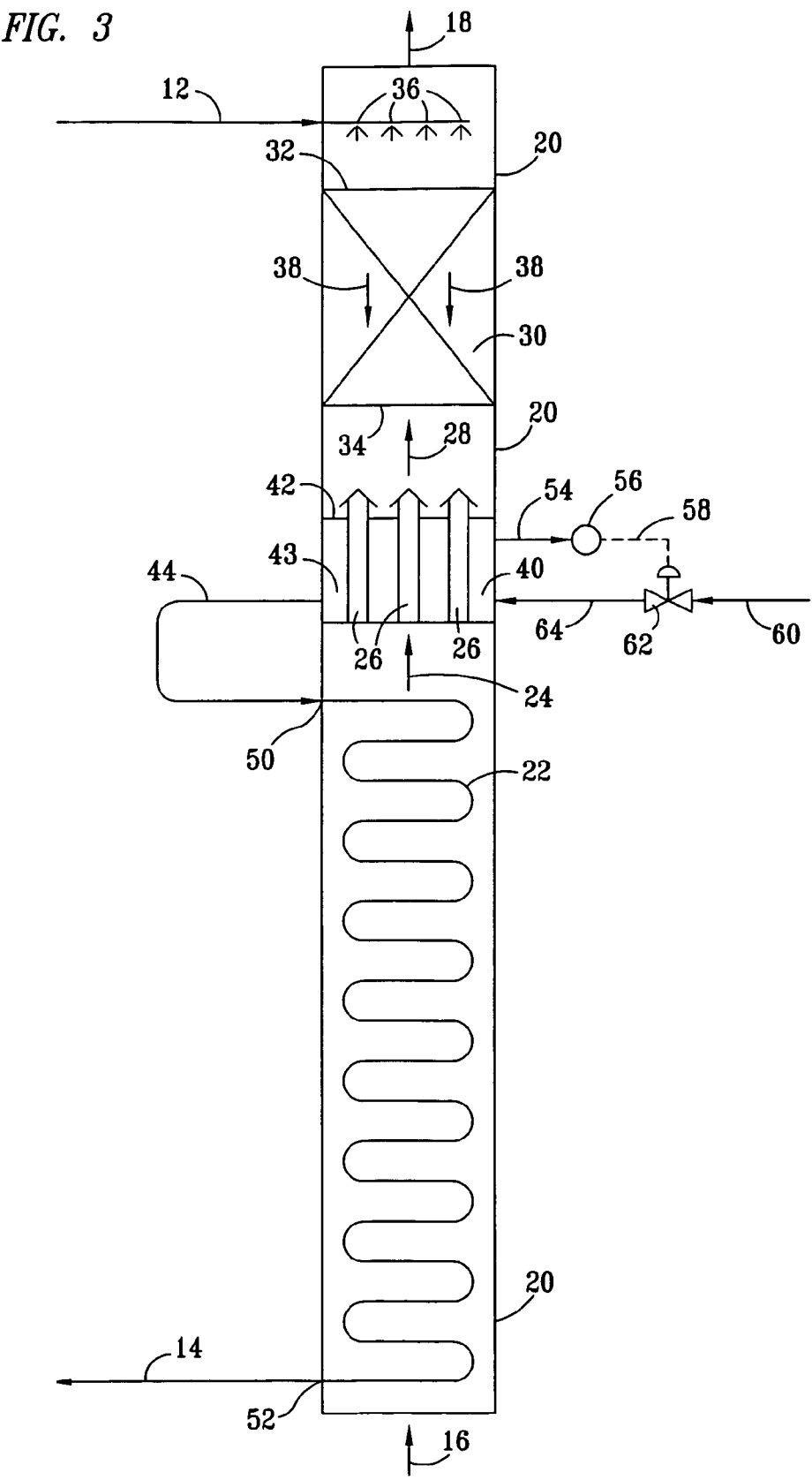
FIG. 3 shows a further embodiment of the present invention.

In FIG. 3, an alternate embodiment of the present invention is shown which is varied only in that the configuration of the vessel has been changed to position the heat exchanger coil 22 in a vertical position rather than in a horizontal position. Such variations are well within the scope of the preset invention. This embodiment may not require a pump in line 44.

Figure 4:
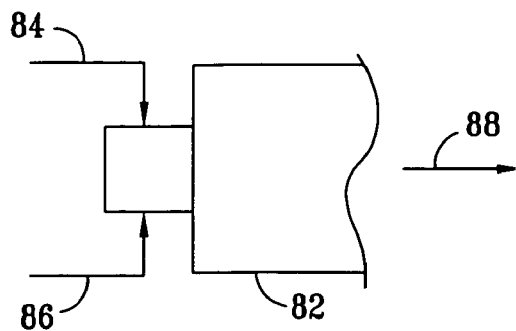
FIG. 4 is a schematic diagram of an in-line heater useful to generate a hot gas for use in apparatus and method of the present invention.

The hot gas stream can be supplied from a variety of sources. One such source is shown in FIG. 4 wherein a fired combustion heater 82 is shown with the combustion heater being fired by a fuel from a line 84 and air from a line 86 to produce a hot exhaust gas 88.

Figure 5:
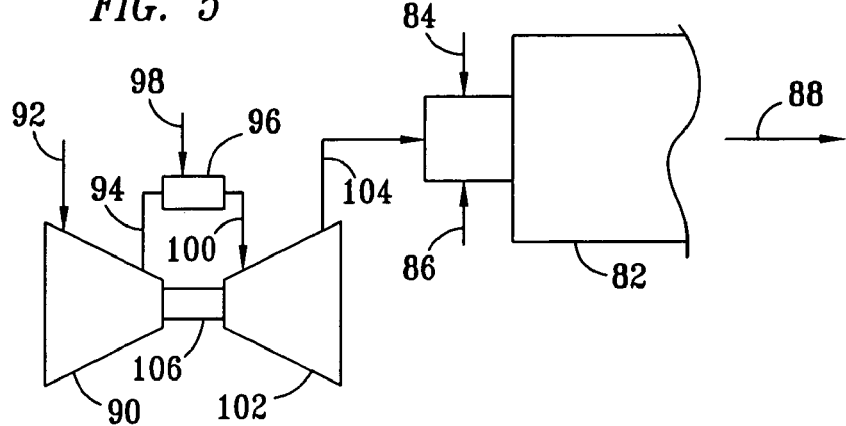
FIG. 5 shows a turbine coupled to a fired heater for the production of hot gas; and, FIG. 6 shows a turbine with a supplemental duct heater.

Similarly in FIG. 5, a hot gas stream is produced from a turbine system which comprises a compressor 90, fed by an inlet air line 92 to produce a compressed air stream which is discharged via a line 94 to a combustion chamber 96 which supplies hot combustion gas to a turbine 102 via a line 100. Gas is supplied to combustion chamber 96 via a line 98. A hot exhaust gas is produced by turbine 102 and discharged via a line 164 as a hot exhaust gas stream. Typically compressor 90 and turbine 102 are operated on a common shaft 106 so that turbine 102 can drive compressor 90. Such embodiments are typical but other embodiments can be used as desired and are effective to produce a stream of hot exhaust gas. The stream of hot exhaust gas in line 104 is passed to a fired combustion heater 82 fueled by fuel from a line 84 and air from a line 86 to produce a higher temperature in the exhaust gas than the gas temperature as recovered from turbine 102.

Figure 6:
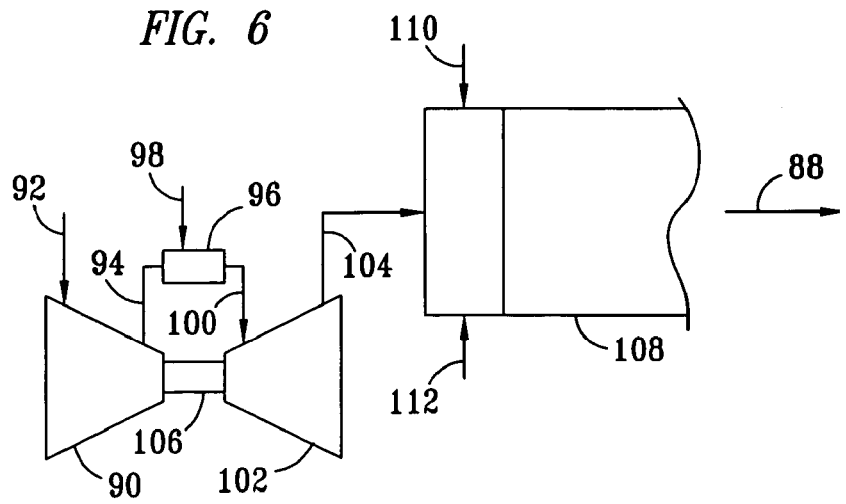

In FIG. 6 an alternate embodiment is shown wherein a duct burner 108 is shown fueled by a fuel line 110 and an air line 112 to produce a hot exhaust gas stream 88.

In the practice of the method of the present invention, the liquid stream recovered as a cool liquid stream from the recirculating loop is first contacted with an intermediate temperature gas which is typically at a temperature from about 250 to about 350° F. as it enters quench column 30. In quench column 30 by direct heat exchange with the liquid, efficient heat transfer is accomplished and the gas stream is cooled to a temperature as indicated to from about 10 to about 50° F. above ambient temperature. The intermediate temperature liquid 40 recovered in collection zone 43 is typically at a temperature from about 100 to about 150° F. as withdrawn and passed via line 44 to heat exchanger 22. The hot liquid produced through line 14 is typically at a temperature from about 270 to about 300° F. The exhaust gas passed to the heat exchanger through line 16 is typically at a temperature from about 1000 to about 2200° F.

The quench column may be packed with any suitable packing material to facilitate intimate liquid contact with the rising intermediate temperature gas. Any suitable packing can be used in this column, as known to those skilled in the art. Some suitable materials are random packing (saddles, pall rings), structure packing, or the like. In some cases, the quench column internals can be designed with no structure to facilitate surface contact directly with the exhaust gas.

Very efficient heat exchange is accomplished in this quench column. To further heat the liquid, it is passed through a heat exchanger in indirect contact with the hot gas charged to the heat exchanger. As indicated previously, the hot gas may be an exhaust gas from a unit which produces a hot exhaust gas stream.

In the quench column the contact is referred to as gas-to-liquid contact and is very efficient for heat transfer. However, there are certain temperature limitations on this heat exchange operation because of the volatility of the heated fluid, which is typically water. The liquid is most readily heated to temperatures up to about 150° F. by direct heat exchange. Heating beyond these temperatures by gas-to-liquid contact will result in excessive loss of liquid by evaporation. Higher temperatures require the use of indirect heat exchange where the liquid is heated in a closed system heat exchanger to reach its desired outlet temperature. Typically such heat exchangers may be coiled tube exchangers, shell and tube heat exchangers and the like. By combining the use of a quench column heater with the indirect heater, a high temperature is readily achieved in the outlet liquid stream while preserving the efficiency of the contacting in the quench column.

As indicated previously, such liquid streams are readily used in circulating liquid loops to deliver heat to a desired operation. The revaporization of LNG is one operation which is readily accomplished using the hot liquid stream. The hot liquid stream can be used in shell and tube heat exchangers, coiled heat exchangers, air vaporization heat exchangers and the like to revaporize LNG. Of course, the hot liquid can also or alternatively be used to deliver heat for other processing requirements. While the invention has been discussed with reference to liquid generally the most frequently used and preferred liquid will be water.

Further while a recirculating loop has not been shown, it will be understood that the liquid recovered through line 14 may be passed to a heat exchange zone and retrieved via a line 12 after it has been cooled. Alternatively the liquid passed through line 12 may be from a different source and the liquid recovered through line 14 may be used for heating purposes without return to the quench column heater. Such variations are well within the scope of the present invention.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A quench column heater having a liquid inlet, a hot liquid outlet, a hot gas inlet and a cooled gas outlet and adapted to heat a liquid stream by heat exchange with a hot gas stream to produce a hot liquid stream and a cooled gas stream, the heater comprising:
   a) a heat exchanger including a passageway for the flow of an intermediate temperature liquid stream to produce a hot liquid stream and an intermediate temperature gas stream by indirect heat exchange contact with a passageway for the hot gas stream from the hot gas inlet to produce the hot liquid stream via the hot liquid outlet and the intermediate temperature gas stream;
   b) a quench column adapted to receive the liquid stream via the liquid inlet and pass the liquid stream into the quench column from a top of the quench column for recovery from a bottom of the quench column in gas-to-liquid contact with the intermediate temperature gas stream to produce an intermediate temperature liquid stream and a cooled gas stream for discharge via the cooled gas outlet;
   c) a collection zone to collect the intermediate temperature liquid from the quench column; and,
   d) a conduit in fluid communication with the collection zone and an intermediate temperature liquid inlet to the heat exchanger.

2. The heater of claim 1 wherein the liquid inlet includes sprays above the top of the quench column.

3. The heater of claim 1 wherein the heat exchanger includes in the hot gas passageway a selective catalytic reduction zone.

4. The heater of claim 1 wherein the intermediate temperature liquid is passed in countercurrent heat exchange with the hot gas stream.

5. The heater of claim 1 wherein the heater includes an intermediate temperature liquid analyzer and a treating chemicals line.

6. The heater of claim 1 wherein the gas-to-liquid contact in the quench zone is by countercurrent contact of the liquid stream and the intermediate temperature gas stream.

7. A method for heating a liquid stream by a combination of gas-to-liquid contact in a quench heater and indirect heat exchange contact between the liquid stream and a hot gas stream, the method comprising:
   a) passing the liquid stream into a quench column for downward flow through the quench column in heat exchange direct contact with an intermediate temperature gas stream to produce a cool gas stream and an intermediate temperature liquid stream;
   b) passing the intermediate temperature liquid stream to an indirect heat exchange heat exchanger for heat exchange with the hot gas stream to produce a hot liquid stream and the intermediate temperature gas stream;
   c) recovering the hot liquid stream; and,
   d) discharging the cool gas stream.

8. The method of claim 7 wherein the intermediate temperature liquid stream is collected in a liquid collection zone.

9. The method of claim 8 wherein intermediate temperature liquid is passed from the liquid collection zone to indirect heat exchange with the hot gas stream.

10. The method of claim 8 wherein the intermediate temperature liquid in the collection zone is tested to determine the pH level of the intermediate temperature liquid.

11. The method of claim 10 wherein the pH is adjusted if required by adding sodium bicarbonate to the liquid in the collection zone.

12. The method of claim 7 wherein the hot gas stream is treated by a selective catalytic reduction catalyst to reduce the NOx content of the hot gas stream.

13. The method of claim 7 wherein the cool gas is discharged at a temperature of about 10° F. above the ambient temperature.

14. The method of claim 7 wherein the hot gas steam passed to indirect heat exchange has a temperature from about 1000° F. to about 2200° F.

15. The method of claim 7 wherein the liquid stream recovered from the quench column has a temperature from about 80° F. to about 150° F.

16. The method of claim 7 wherein the intermediate temperature gas steam passed to the quench column at a temperature from about 250° F. to about 350° F.

17. The method of claim 7 wherein the hot water stream is used to heat at least one of an air stream to vaporize a liquid natural gas stream or a vaporized natural gas stream.

18. The method of claim 7 wherein the hot gas stream is at least one of an exhaust gas stream from a turbine, an exhaust gas stream from an in-line heater and other fired heaters.

19. The method of claim 7 wherein the liquid stream and the hot liquid stream comprise a heat transfer liquid flow loop.

20. The method of claim 19 wherein the pH of the liquid in the liquid flow loop is maintained at a value from about 6.0 to about 8.0.

* * * * *